(12) United States Patent
Beesley

(10) Patent No.: US 7,217,028 B2
(45) Date of Patent: May 15, 2007

(54) OFF-AXIS GOBLET FOR FOOD MIXER

(75) Inventor: Brian K. Beesley, Sandy, UT (US)

(73) Assignee: Back to Basics Products, LLC, Vernon Hills, IL (US)

( * ) Notice: Subject to any disclaimer, the term of this patent is extended or adjusted under 35 U.S.C. 154(b) by 106 days.

(21) Appl. No.: 10/805,175

(22) Filed: Mar. 19, 2004

(65) Prior Publication Data

US 2005/0207270 A1    Sep. 22, 2005

(51) Int. Cl.
 *A47J 43/046* (2006.01)
(52) U.S. Cl. ................ 366/199; 366/205; 366/314
(58) Field of Classification Search ............... 366/199, 366/205, 314; 241/199.12, 282.1, 282.2
See application file for complete search history.

(56) References Cited

U.S. PATENT DOCUMENTS

| | | | |
|---|---|---|---|
| 373,113 A | 11/1887 | Wagner | |
| 374,706 A | 12/1887 | Rosenkranz | |
| 531,601 A * | 12/1894 | Schults | 241/301 |
| 1,412,536 A | 4/1922 | Mayer | |
| 1,412,996 A * | 4/1922 | Blessing | 99/501 |
| 1,757,326 A * | 5/1930 | Miller | 99/503 |
| 1,809,363 A * | 6/1931 | Teare | 241/152.2 |
| 1,874,079 A | 8/1932 | Black | |
| 1,930,948 A * | 10/1933 | Brewer | 366/314 |
| 2,066,997 A | 1/1937 | Mueller | |
| 2,070,545 A | 2/1937 | Gilbert | |
| 2,086,858 A | 7/1937 | Dunkelberger | |
| 2,249,817 A * | 7/1941 | Fromm | 99/503 |
| 2,282,866 A | 5/1942 | Hagen | |
| 2,311,379 A * | 2/1943 | Gillanders | 99/512 |
| 2,315,018 A | 3/1943 | Lawrence | |
| 2,559,196 A | 7/1951 | Medved | |
| 2,628,081 A | 2/1953 | Laird | |
| 2,688,473 A * | 9/1954 | Posch | 366/51 |
| 2,785,547 A | 3/1957 | Barros | |
| 2,825,542 A * | 3/1958 | Jackson | 261/87 |
| 2,851,258 A | 9/1958 | Siehrs | |
| 2,945,634 A | 7/1960 | Beck et al. | |
| 3,088,345 A | 5/1963 | Campbell | |
| 3,107,711 A | 10/1963 | Azmus | |
| 3,216,473 A | 11/1965 | Dewenter | |
| 3,240,246 A | 3/1966 | Dewenter | |
| 3,315,947 A | 4/1967 | Nauta | |
| 3,345,043 A * | 10/1967 | Bovagne | 366/314 |
| 3,346,029 A | 10/1967 | Harris | |
| 3,417,972 A | 12/1968 | Vincent | |
| 3,427,636 A | 2/1969 | Seifert | |
| 3,765,275 A | 10/1973 | Johnson | |
| 3,780,393 A | 12/1973 | Gaetke | |
| 3,895,548 A | 7/1975 | Sauve | |
| 3,920,224 A | 11/1975 | Fassauer | |
| 4,030,707 A | 6/1977 | Moreton | |

(Continued)

FOREIGN PATENT DOCUMENTS

WO    WO 03/001954 A1    1/2003

*Primary Examiner*—David Sorkin
(74) *Attorney, Agent, or Firm*—Workman Nydegger

(57) ABSTRACT

An off-axis goblet or container for a food or beverage mixer has a longitudinal axis centered therein. A mixing assembly is disposed in the goblet or container and has a rotational axis. The longitudinal and rotational axes of the goblet and mixing assembly are different and non-collinear.

24 Claims, 4 Drawing Sheets

U.S. PATENT DOCUMENTS

| | | | |
|---|---|---|---|
| 4,137,578 A | 2/1979 | Felici | |
| 4,201,487 A | 5/1980 | Backhaus | |
| 4,250,771 A | 2/1981 | Berler | |
| 4,268,080 A | 5/1981 | Lindley | |
| 4,337,000 A | 6/1982 | Lehmann | |
| D269,471 S | 6/1983 | Auerbach | |
| 4,395,792 A | 8/1983 | Cosner | |
| 4,397,427 A | 8/1983 | Howard | |
| 4,488,664 A | 12/1984 | Cleland | |
| 4,513,688 A | 4/1985 | Fassauer | |
| 4,525,072 A * | 6/1985 | Giusti | 366/171.1 |
| 4,537,332 A | 8/1985 | Brown et al. | |
| 4,561,782 A | 12/1985 | Jacobsen et al. | |
| 4,664,530 A | 5/1987 | Kurome et al. | |
| 4,891,966 A | 1/1990 | Kramer | |
| 5,026,169 A * | 6/1991 | Titus | 366/287 |
| 5,302,021 A | 4/1994 | Jennett et al. | |
| 5,323,691 A | 6/1994 | Reese et al. | |
| 5,323,973 A | 6/1994 | Ferrara, Jr. | |
| 5,356,215 A | 10/1994 | Inoue et al. | |
| D363,634 S | 10/1995 | Cohn | |
| 5,479,851 A | 1/1996 | McClean et al. | |
| 5,518,312 A | 5/1996 | Inoue et al. | |
| 5,636,923 A | 6/1997 | Nejat-Bina | |
| 5,662,032 A | 9/1997 | Barretta | |
| 5,758,963 A | 6/1998 | Xie et al. | |
| 5,823,667 A | 10/1998 | Fukushima et al. | |
| 6,523,994 B2 | 2/2003 | Lawson | |
| 6,527,433 B2 | 3/2003 | Daniels | |
| 6,652,137 B1 | 11/2003 | Bosch et al. | |
| 2001/0006486 A1 | 7/2001 | Ofverberg | |
| 2002/0027175 A1 | 3/2002 | Capp | |
| 2003/0099154 A1 | 5/2003 | Daniels | |
| 2004/0159624 A1 | 8/2004 | Miller et al. | |
| 2005/0018534 A1* | 1/2005 | Nikkah | 366/205 |
| 2005/0105390 A1* | 5/2005 | Albright | 366/314 |
| 2006/0176765 A1* | 8/2006 | Pryor et al. | 366/192 |

* cited by examiner

OFF-AXIS GOBLET FOR FOOD MIXER

BACKGROUND OF THE INVENTION

1. Field of the Invention

The present invention relates generally to blenders, food or beverage mixers, smoothie makers and the like.

2. Related Art

Blenders or mixers typically have a rotating blade assembly disposed in the bottom of a goblet. The rotating blades mix and/or chop food items or liquid placed inside the goblet. The rotating motion of the blades often imparts a rotational movement to the food items or liquid in the goblet. In addition, a vortex motion can be imparted to the food items or liquid.

One difficulty with blenders is incomplete mixing or processing. For example, some food items can become suspended in the mixture without moving towards the blades. As another example, thicker mixes, such as milk shakes or smoothies, can become static or resist movement. In particular, thicker mixes can clog or stall the blender.

Various solutions have been utilized to facilitate mixing, including ribs protruding from the inside of the goblet, and stir-sticks extending into the goblet. Improving mixing or processing is an ongoing quest.

SUMMARY OF THE INVENTION

It has been recognized that it would be advantageous to develop an improved mixer or blender with improved mixing or blending abilities.

The invention provides a goblet device for use with a food mixer. The goblet can be a container with a longitudinal axis centered therein. A mixing assembly can be disposable within the container, and has a rotational axis. The longitudinal axis of the container advantageously is different than, and non-collinear with respect to, the rotational axis of the mixing assembly.

In accordance with a more detailed aspect of the present invention, the longitudinal and rotational axes can be offset with respect to one another. In addition, the longitudinal and rotational axes can be oriented transverse with respect to one another. Furthermore, the rotational axis can be oriented substantially vertical, while the longitudinal axis can be oriented at an acute angle with respect to vertical.

In accordance with another more detailed aspect of the present invention, the container can include a front wall oriented substantially vertical, and a rear wall oriented at an acute angle with respect to vertical. In addition, the container can have upper and lower horizontal cross-sections that are non-concentric. Furthermore, the container can have a tilted upper edge forming an acute angle with respect to horizontal.

In accordance with another more detailed aspect of the present invention, the container can be disposable on a base having a motor capable of turning a drive mechanism extending therefrom. The drive mechanism can be engageable with the mixing assembly. In addition, the base and goblet can be configured to facilitate dispensing contents of the container. A spout can be coupled to the container, and a cup indentation can be formed in the base at a position underneath the spout when the container is disposed on the base. The cup indentation can extend into the base, and can extend vertically from the spout through a bottom of The base. A pair of protrusions can extend from the base with the cup indentation therebetween to provide stability to the base, particularly when the spout is operated.

Additional features and advantages of the invention will be apparent from the detailed description which follows, taken in conjunction with the accompanying drawings, which together illustrate, by way of example, features of the invention.

DETAILED DESCRIPTION

Figure 1:
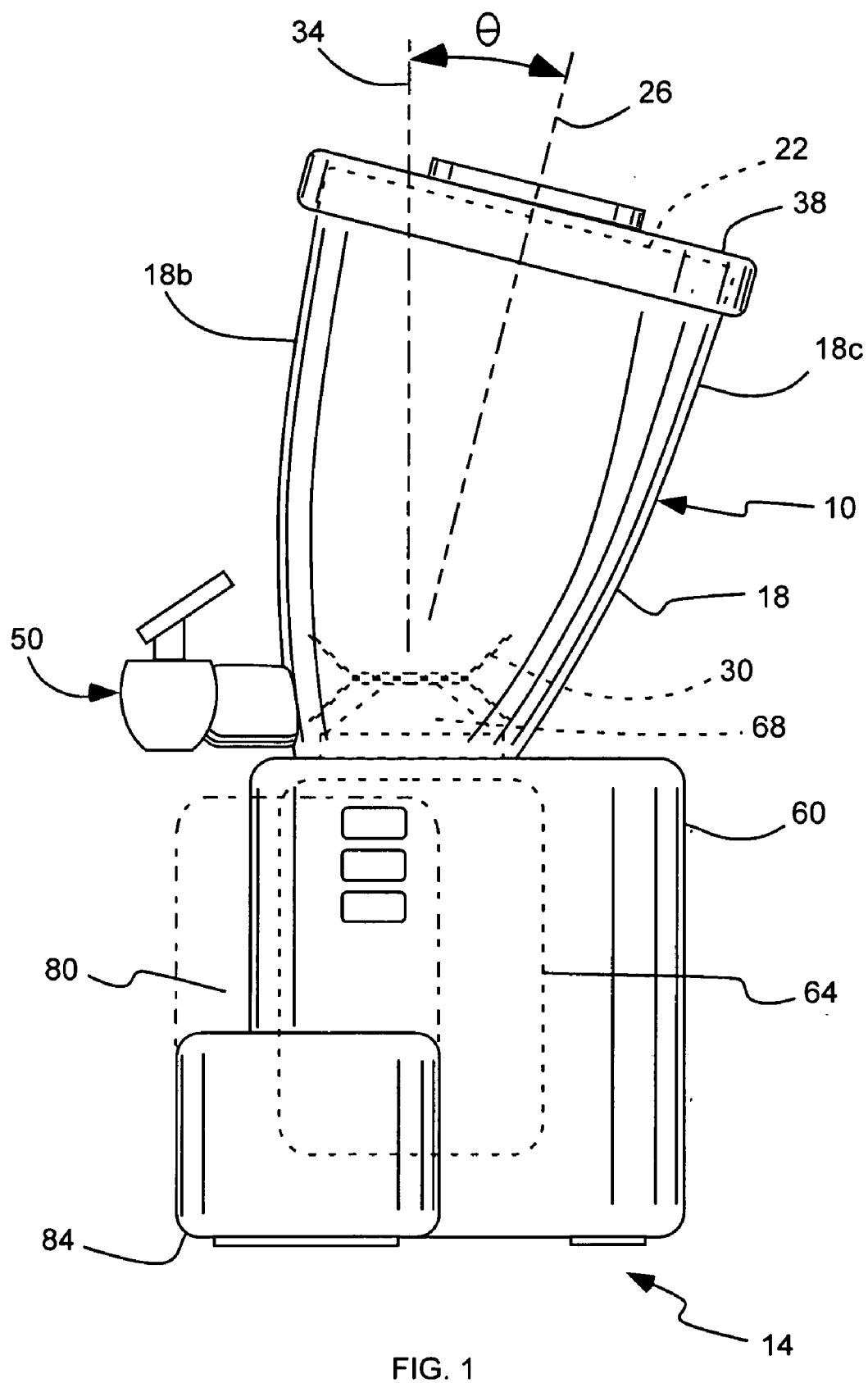
FIG. 1 is a side view of a food mixer with a goblet in accordance with an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

As illustrated in FIGS. 1–4, a goblet or goblet device, indicated generally at 10, in accordance with the present invention is shown for use with a food mixer or food mixer device, indicated generally at 14. The term "food mixer" is used broadly herein to refer to food mixers, beverage mixers, blenders, smoothie makers, and the like that mix or blend food and/or liquid. The goblet 10 can receive food and/or liquid to be mixed or blended into a food or beverage. Smoothies are one example of a food or beverage that can be made by placing smoothie ingredients, such as ice, fruit, etc., into the goblet to be blended.

Figure 2:
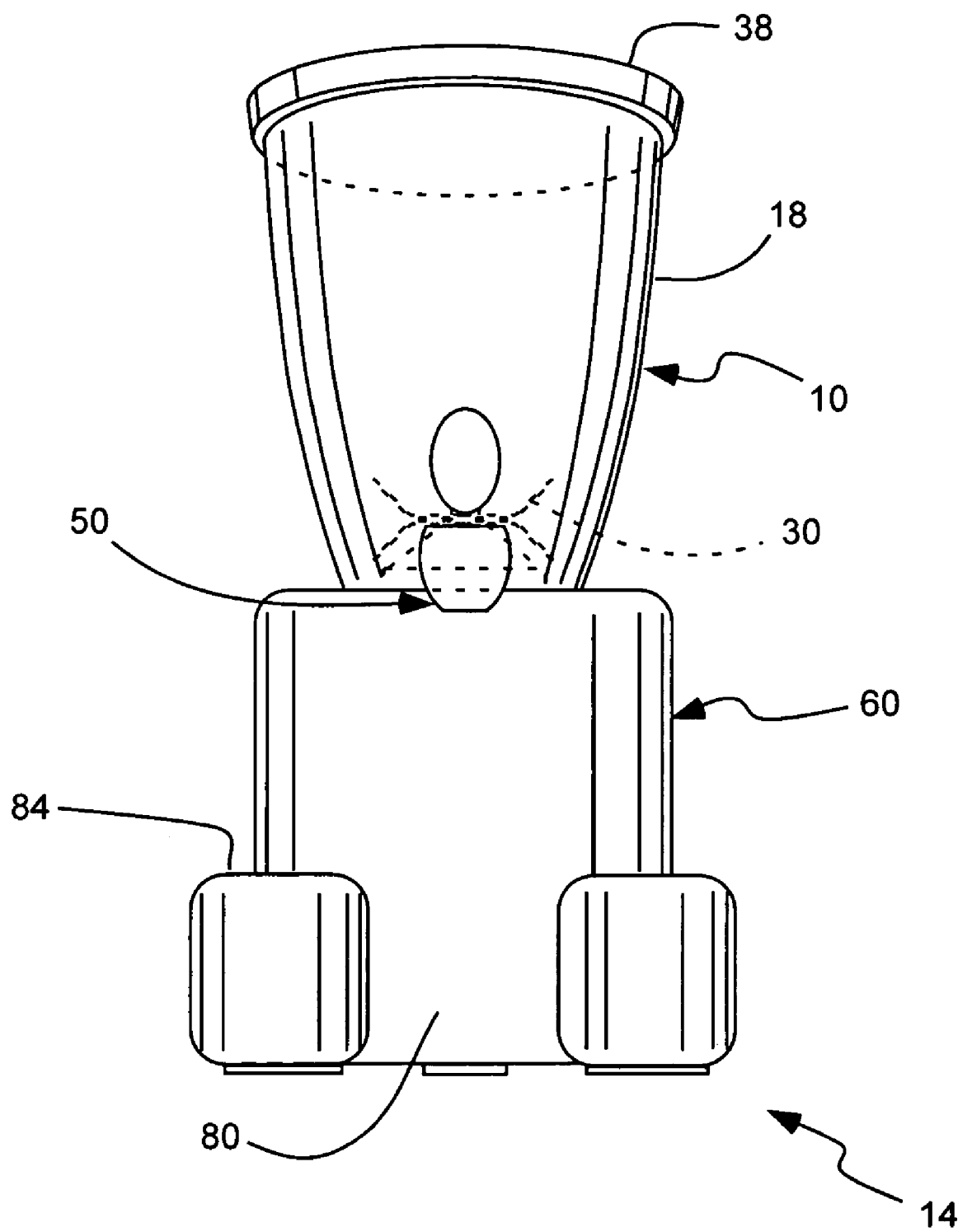
FIG. 2 is a front view of the food mixer with the goblet of FIG. 1.
Figure 4:
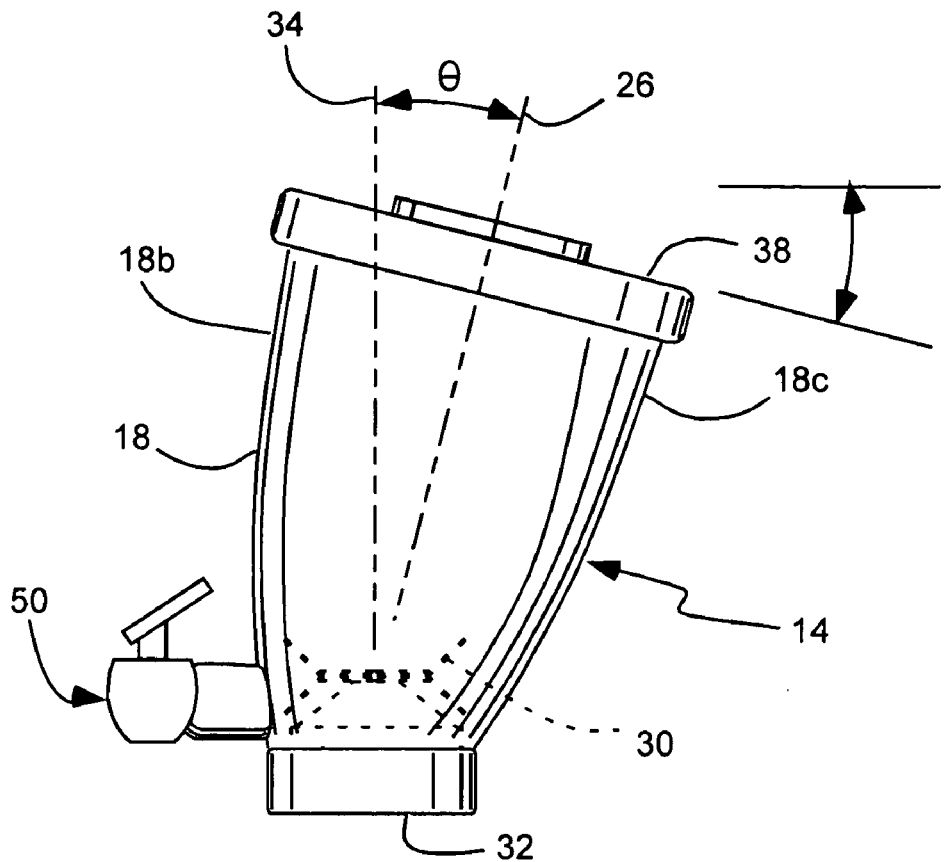
FIG. 4 is a side view of the goblet of FIG. 1.
Figure 3:
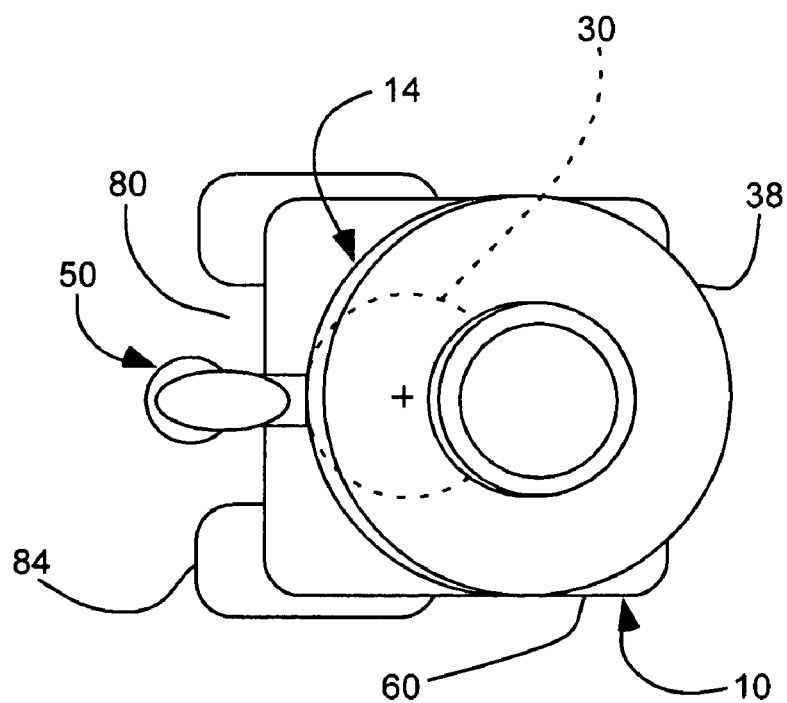
FIG. 3 is a top view of the food mixer with the goblet of FIG. 1.
Figure 5:
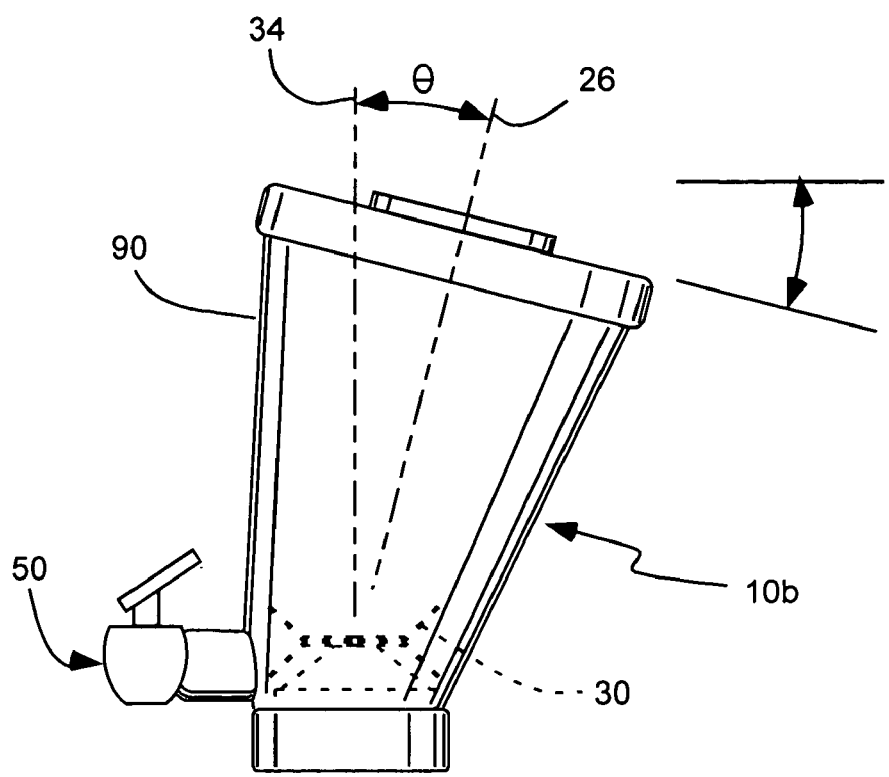
FIG. 5 is a side view of another food mixer with another goblet in accordance with an embodiment of the present invention.
Figure 6:
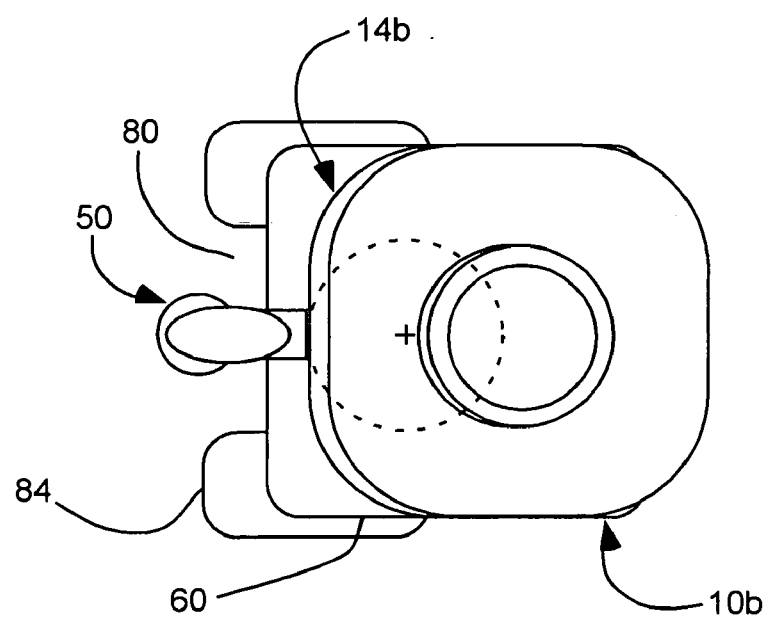
FIG. 6 is a top view of the food mixer with the goblet of FIG. 5.

The goblet 10 can be a container with a container wall 18 forming a perimeter or circumference of the goblet or container. The container wall 18 can be formed of glass or plastic. The goblet 10 or container wall 18 can have an upper edge 22 forming an opening so that the goblet has an open upper end. In addition, the goblet or container wail can have a lower opening. The goblet 10 or container wall 18 can have an inverted, substantially frusto-conical shape. The container wall 18 can have a curvature, or can be arcuate, as shown in FIGS. 1, 2 and 4. Alternatively, the container wall 90 can be straight, as shown in FIG. 5. The goblet 10 also can have a longitudinal axis 26 that can be substantially centered in the goblet, or within the container wall. The goblet 10 can have an annular cross-sectional shape, with the longitudinal axis substantially concentric with the annular cross-sectional shape. Alternatively, the goblet 10*b* can have other cross-sectional shapes, such as rectangular or square with rounded corners, as shown in FIG. 6.

A mixing assembly 30 can be disposed in the goblet 10 or container, such as at the bottom. The mixing assembly 30 can include a base cap/plug 32 (FIG. 4) to close the lower opening in the goblet. The base cap/plug 32 has a lower horizontal edge (see FIG. 4) adapted for horizontal placement on the motorized base 60 (see FIG. 1) and the mixing assembly 30 can be coupled to the goblet 10 such as by a threaded coupling, or a twist lock. One or more seals or rings can be disposed between the base cap/plug and the mixing assembly to form a seal so that the goblet or container does not leak. The mixing assembly can also include one or more blades or stirring members that are rotatable or pivotable with respect to the goblet. The mixing assembly 30 can have a rotational axis 34 about which the blade(s) or stirring member(s) rotate or pivot. The mixing assembly 30 can be removably coupled to the goblet so that it can be removed for cleaning. Such mixing assemblies are known in the art.

The longitudinal axis 26 of the goblet 10 advantageously is different than, and non-colinear with respect to, the rotational axis 34 of the mixing assembly 30. In accordance with one aspect of the present invention, the longitudinal axis 26 can be tilted rearward. It will be appreciated that typical blenders include a container that is concentric with the mixing assembly. This alignment of the container and mixing assembly in typical blenders often results in a uniform vortex action or uniform circular action with less efficient mixing. The goblet 10 of the present invention is advantageously off-axis, or non-concentric, with the mixing assembly. It is believed that such an off-axis or non-concentric configuration results in a non-uniform vortex or circular action for more efficient mixing. In use, food or liquid in the goblet moves around the longitudinal axis of the goblet under the influence of the mixing assembly, but its motion is non-uniform and interrupted by the off-axis or non-concentric configuration of the goblet. Thus, the off-axis goblet assists in providing turbulence to the contents as they are mixed, increasing the efficiency of the mixing or blending.

The off-axis or non-concentric goblet 10, and the non-colinear axes 26 and 34, can be described in various ways. The longitudinal and rotational axes 26 and 34 can be angled or divergent with respect to one another. In addition, the longitudinal and rotational axes 26 and 34 can be offset or spaced [-] apart with respect to one another. In addition, the longitudinal and rotational axes can be oriented transverse with respect to one another, so that they intersect on one another but are oriented at different angular orientations. Furthermore, the rotational axis 34 can be oriented substantially vertical, while the longitudinal axis 26 can be oriented at an acute angle $\ominus$ with respect to vertical.

A lid 38 can be disposed on the goblet 10 to resist undesired release of the contents. The lid 38 can couple to the goblet with a twist lock, threaded coupling, press-fit, snap-fit, etc. The lid 38 can include an aperture or opening. A stir-stick can be carried by the lid, and can extend through the opening. The stir-stick can include a handle disposed above the lid, and a stir portion disposed beneath the lid. The stir-stick allows a user to stir the contents of the container. The lid can be rigid to resist the stir-stick from coming into contact with the blades of the mixing assembly.

The goblet 10 can also include a spout 50, spigot or faucet to facilitate dispensing the contents. The spout 50 can be coupled near or at the bottom of the goblet, and can include a valve to selectively operate the spout, and to selectively dispense the contents. An actuator handle can be coupled to the valve to operate the valve. The valve can be disposed on a distal end of the spout. The vertical front wall 18b of the goblet can allow the spout 50 to be shorter, and the valve to be positioned closer to the goblet. It will be appreciated that the contents of the goblet can be thick or viscous, and that the length of the spout can affect the ability of the spout. Thus, a shorter spout provides less frictional losses.

The mixer 14 can include a base 60 having a motor 64 turning a drive mechanism 68 extending from the base to engage the mixing assembly 30. The goblet 10 is disposable on the base 60 with the drive mechanism engagable with the mixing assembly. A socket or receptacle can be formed on the top of the base to receive the base cap/plug of the goblet. The socket or receptacle can hold the goblet as the mixing assembly and drive mechanism rotate. The goblet 10 can be removably disposed on the base. The mixing assembly and the drive mechanism can include intermeshing members to transmit rotational force from the drive mechanism to the mixing assembly.

A cup indentation 80 can be formed in the base 60 at a position underneath the spout 50 with the goblet disposed on the base. The cup indentation extends into the base, and can extending vertically downward from the spout through a bottom of the base, so that the base is open to a support surface upon which the base is disposed at the cup indentation. A pair of protrusions 84 can extend from the base on each side of the cup indentation. The protrusions 84 can help stabilize the base when the valve or spout is actuated. The protrusions can extend substantially the height of the base, as shown in phantom lines, or can be less than the height of the base, as shown in solid lines. The shorter protrusions can cause less interference with the operation of the valve or spout. The cup indentation can be defined between the protrusions.

Various aspects of smoothie makers and/or beverage mixers are described in U.S. Pat. No. 6,527,433; and U.S. patent application Ser. No. 10/278,713, filed Oct. 23, 2002; which are herein incorporated by reference.

It is to be understood that the above-referenced arrangements are illustrative of the application for the principles of the present invention. It will be apparent to those of ordinary skill in the art that numerous modifications can be made without departing from the principles and concepts of the invention as set forth in the claims.

What is claimed is:

1. A goblet device configured for use with a motorized base as a food mixer, the device comprising:
   a) a container wall having
      an upper edge forming an opening which defines an open upper end of the container wall, and
      having a lower opening adapted for horizontal coupling to a mixing assembly,
      said container wall having a longitudinal axis substantially centered within said container wall, and having a plane defined by said open upper end of the container wall;
   b) a mixing assembly that comprises
      a base cap to close said lower opening of the container wall,
      said base cap having a lower horizontal edge,
      said lower horizontal edge being adapted for horizontal placement on the motorized base, and
      said base cap being removably couplable to the container wall so that the mixing assembly can be removed for cleaning,
      a plurality of blades disposable within the container wall so as to be centered near the bottom of the container wall when the mixing assembly is coupled to said lower opening of the container wall,
      said plurality of blades being spaced away from the sides of the container wall and mounted about a single rotational axis; and
   c) wherein the container wall and the mixing assembly are angled relative to one another in that the plane defined by said open upper end of the container wall is not perpendicular relative to the rotational axis of the mixing assembly so as to form an off-axis configuration resulting in more efficient mixing action.

2. A goblet device configured for use with a motorized base as a food mixer, the device comprising:
   a) a container wall having
      an upper edge forming an opening which defines an open upper end of the container wall, and
      having a lower opening adapted for horizontal coupling to a mixing assembly,
      said container wall having a longitudinal axis substantially centered within said container wall, and having a plane defined by said open upper end of the container wall;
   b) a mixing assembly that comprises
      a base cap to close said lower opening of the container wall,
      said base cap having a lower horizontal edge,
      said lower horizontal edge being adapted for horizontal placement on the motorized base, and
      said base cap being removably couplable to the container wall so that the mixing assembly can be removed for cleaning,
      a plurality of blades disposable within the container wall so as to be centered near the bottom of the container wall when the mixing assembly is coupled to said lower opening of the container wall,
      said plurality of blades being spaced away from the sides of the container wall and mounted about a single rotational axis; and
   c) wherein the container wall and the mixing assembly are arranged in relation to one another in that the plane defined by said open upper end of the container wall is not perpendicular relative to the rotational axis of the mixing assembly so that together the container wall and the mixing assembly provide an off-axis means for creating a non-uniform vortex in material within the container wall when the mixing assembly operates to mix the material within the container wall.

3. A device in accordance with claims 1 or 2, wherein the longitudinal and rotational axes are offset with respect to one another.

4. A device in accordance with claims 1 or 2, wherein the longitudinal and rotational axes are oriented transverse with respect to one another.

5. A device in accordance with claims 1 or 2, wherein the rotational axis is oriented substantially vertical, and wherein the longitudinal axis is oriented at an acute angle with respect to vertical.

6. A device in accordance with claims 1 or 2, wherein the container wall includes a front wall oriented substantially vertical, and a rear wall oriented at an acute angle with respect to vertical.

7. A device in accordance with claims 1 or 2, wherein the container wall has upper and lower horizontal cross-sections that are non-concentric.

8. A device in accordance with claims 1 or 2, wherein the container wall has a tilted upper edge forming an acute angle with respect to horizontal.

9. A device in accordance with claims 1 or 2, further comprising:
   a) a base having a horizontal bottom and a motor capable of turning a drive mechanism extending therefrom, the mixing assembly being horizontally disposable on the base when the container wall is coupled to the mixing assembly, so that said drive mechanism is engaged with the mixing assembly, the container wall and base thereafter being ready for use as a food mixer;
   b) a spout, coupled to the container wall;
   c) a cup indentation formed in the base at a position underneath the spout when the container wall and mixing assembly are disposed on the base, the cup indentation extending into the base and extending vertically from the spout through a bottom of the base; and
   d) a pair of protrusions, extending from the base with the cup indentation therebetween.

10. A goblet device in accordance with claims 1 or 2, wherein the rotational axis of the mixing assembly is oriented substantially vertical and the longitudinal axis of the container wall is oriented at an acute angle with respect to vertical and tilted in a rearward direction such that the rotational and longitudinal axes are non-collinear and transverse with respect to one another.

11. A goblet device in accordance with claims 1 or 2, wherein the longitudinal axis of the container wall is oriented transverse with respect to the rotational axis of the mixing assembly.

12. A device in accordance with claim 11, wherein the rotational axis is oriented substantially vertical; and wherein the longitudinal axis is oriented at an acute angle with respect to vertical.

13. A device in accordance with claim 11, wherein the longitudinal axis of the container wall is oriented at an acute angle greater than zero with respect to the rotational axis of the mixing assembly.

14. A goblet device in accordance with claims 1 or 2, wherein the longitudinal axis of the container wall is oriented at an acute angle greater than zero with respect to the rotational axis of the mixing assembly.

15. A device in accordance with claim 14, wherein the rotational axis is oriented substantially vertical; and wherein the longitudinal axis is oriented at an acute angle with respect to vertical.

16. A device in accordance with claim 14, wherein the longitudinal axis of the container wall is oriented transverse with respect to the rotational axis of the mixing assembly.

17. A food mixer device, comprising:
   a) a base with a horizontal bottom and with a motor capable of turning a drive mechanism extending therefrom; and
   b) an off-axis goblet, mountable on the base, comprising
      i) a container wall having
         an upper edge forming an opening which defines an open upper end of the container wall, and
         having a lower opening adapted for horizontal coupling to a mixing assembly,
         said container wall having a longitudinal axis substantially centered within said container wall, and having a plane defined by said open upper end of the container wall;
      ii) a mixing assembly that comprises
         a base cap to close said lower opening of the container wall,
         said base cap having a lower horizontal edge,
         said lower horizontal edge being adapted for horizontal placement on the motorized base, and
         said base cap being removably couplable to the container wall so that the mixing assembly can be removed for cleaning,
         a plurality of blades engageable with the drive mechanism and disposable within the container wall so as to be centered near the bottom of the container wall when the mixing assembly is coupled to said lower opening of the container wall, said plurality of blades being spaced away from the sides of the container wall and mounted about a single rotational axis, and iii) wherein the container wall and the mixing assembly are angled relative to one another in that the plane defined by said open upper end of the container wall is not perpendicular relative to the rotational axis of the mixing assembly so as to form an off-axis configuration resulting in more efficient mixing action.

18. A food mixer device, comprising:

a) a base with a horizontal bottom and with a motor capable of turning a drive mechanism extending therefrom; and b) an off-axis goblet, mountable on the base, comprising
i) a container wall having
an upper edge forming an opening which defines an open upper end of the container wall, and
having a lower opening adapted for horizontal coupling to a mixing assembly,
said container wall having a longitudinal axis substantially centered within said container wall, and
having a plane defined by said open upper end of the container wall;
ii) a mixing assembly that comprises
a base cap to close said lower opening of the container wall,
said base cap having a lower horizontal edge,
said lower horizontal edge being adapted for horizontal placement on the motorized base, and
said base cap being removably couplable to the container wall so that the mixing assembly can be remove for cleaning,
a plurality of blades engageable with the drive mechanism and disposable within the container wall so as to be centered near the bottom of the container wall when the mixing assembly is coupled to said lower opening of the container wall, said plurality of blades being spaced away from the sides of the container wall and mounted about a single rotational axis, and iii) wherein the container wall and the mixing assembly are arranged in relation to one another in that the plane defined by said open upper end of the container wall is not perpendicular relative to the rotational axis of the mixing assembly so that together the container wall and the mixing assembly provide an off-axis means for creating a non-uniform vortex in material within the goblet when the mixing assembly operates to mix the material within the goblet.

19. A device in accordance with claims 17 or 18, wherein the longitudinal and rotational axes are offset with respect to one another.

20. A device in accordance with claims 17 or 18, wherein the longitudinal and rotational axes are oriented transverse with respect to one another.

21. A device in accordance with claims 17 or 18, wherein the rotational axis is oriented substantially vertical; and wherein the longitudinal axis is oriented at an acute angle with respect to vertical.

22. A device in accordance with claims 17 or 18, wherein the goblet has a front wall oriented substantially vertical, and a rear wall oriented at an acute angle with respect to vertical.

23. A device in accordance with claims 17 or 18, wherein the goblet has upper and lower horizontal cross-sections that are non-concentric.

24. A device in accordance with claims 17 or 18, wherein the goblet has a tilted upper edge forming an acute angle with respect to horizontal.

* * * * *